(12) United States Patent
Gillies

(10) Patent No.: US 10,970,941 B2
(45) Date of Patent: Apr. 6, 2021

(54) ALL SEEING ONE CAMERA SYSTEM FOR ELECTRONIC TOLLING

(71) Applicant: Raytheon Canada Limited, Ottawa (CA)

(72) Inventor: Robert M. Gillies, Woodbridge (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/542,439

(22) Filed: Aug. 16, 2019

(65) Prior Publication Data

US 2020/0134931 A1 Apr. 30, 2020

Related U.S. Application Data

(60) Provisional application No. 62/750,872, filed on Oct. 26, 2018.

(51) Int. Cl.
| | | |
|---|---|---|
| *G07B 15/00* | (2011.01) | |
| *G06K 9/32* | (2006.01) | |
| *G08G 1/017* | (2006.01) | |
| *G06K 9/00* | (2006.01) | |

(52) U.S. Cl.
CPC ......... *G07B 15/00* (2013.01); *G06K 9/00771* (2013.01); *G06K 9/325* (2013.01); *G08G 1/0175* (2013.01); *G06K 2209/15* (2013.01)

(58) Field of Classification Search
CPC .. G07B 15/00; G08G 1/0175; G06K 9/00771; G06K 9/325; G06K 2209/15
USPC ........................................................ 340/937
See application file for complete search history.

(56) References Cited

U.S. PATENT DOCUMENTS

| | | | | |
|---|---|---|---|---|
| 5,554,984 A | * | 9/1996 | Shigenaga | G07B 15/063 340/937 |
| 5,717,390 A | * | 2/1998 | Hasselbring | G01S 13/865 340/933 |
| 5,859,415 A | * | 1/1999 | Blomqvist | G01C 11/02 235/384 |
| 6,109,525 A | * | 8/2000 | Blomqvist | G08G 1/015 235/384 |
| 6,373,962 B1 | * | 4/2002 | Kanade | G06K 9/3258 340/907 |
| 6,810,132 B1 | * | 10/2004 | Umezaki | G06T 7/254 382/104 |

(Continued)

OTHER PUBLICATIONS

International Search Report and Written Opinion for International Application PCT/CA2019/051122 dated Apr. 30, 2020.

*Primary Examiner* — Ojiako K Nwugo
(74) *Attorney, Agent, or Firm* — Renner, Otto, Boisselle & Sklar, LLP

(57) ABSTRACT

A method of electronic tolling for a vehicle travelling on a road surface includes providing a single camera or a single array of cameras, arranging the single camera or the single array of cameras to have a field-of-view that is normal to the road surface and is defined by a plane that is parallel with the road surface, and capturing multiple images of the front, side, top and rear of the vehicle using the single camera or the single array of cameras in the field-of-view. The set of multi-perspective images can be used to identify a vehicle by reading the front and rear license plate and to determine a classification of the vehicle. The images may also be used to track the position of the vehicle on the road surface as the vehicle traverses the field-of-view.

19 Claims, 10 Drawing Sheets

(56) References Cited

U.S. PATENT DOCUMENTS

| | | | |
|---|---|---|---|
| 8,428,861 B1* | 4/2013 | Williams | G08G 1/095 701/301 |
| 8,744,905 B2* | 6/2014 | Robinson | G06Q 30/04 705/13 |
| 2001/0019307 A1* | 9/2001 | Sato | G08G 1/017 340/928 |
| 2002/0001398 A1* | 1/2002 | Shimano | G06K 9/6293 382/104 |
| 2002/0140924 A1* | 10/2002 | Wangler | G08G 1/04 356/28 |
| 2003/0189500 A1* | 10/2003 | Lim | G08G 1/04 340/937 |
| 2012/0155712 A1* | 6/2012 | Paul | G06K 9/00 382/105 |
| 2013/0039532 A1* | 2/2013 | Carbonell | G06K 9/00624 382/103 |
| 2014/0160283 A1 | 6/2014 | Hofman | |
| 2015/0054676 A1* | 2/2015 | Vinski | G01S 13/82 342/51 |
| 2015/0062340 A1* | 3/2015 | Datta | H04N 5/2252 348/148 |
| 2016/0042640 A1 | 2/2016 | Saptharishi | |
| 2018/0158327 A1* | 6/2018 | Gartner | G06K 9/3233 |
| 2018/0165889 A1* | 6/2018 | Liu | G06Q 20/4014 |
| 2019/0378347 A1* | 12/2019 | Gallaway | G06K 9/325 |

* cited by examiner

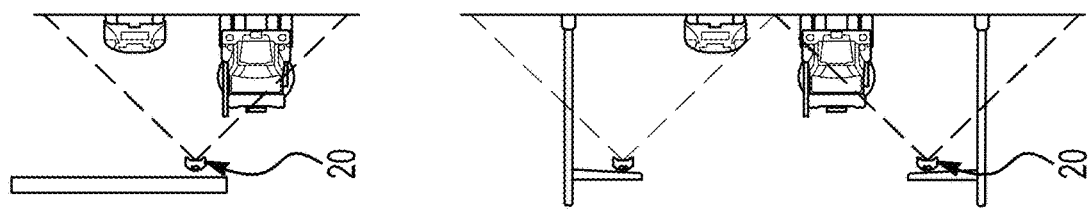
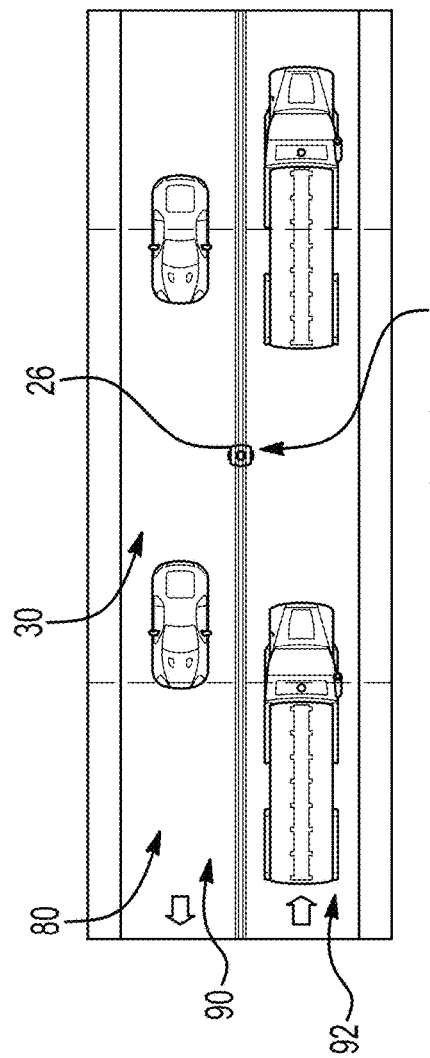
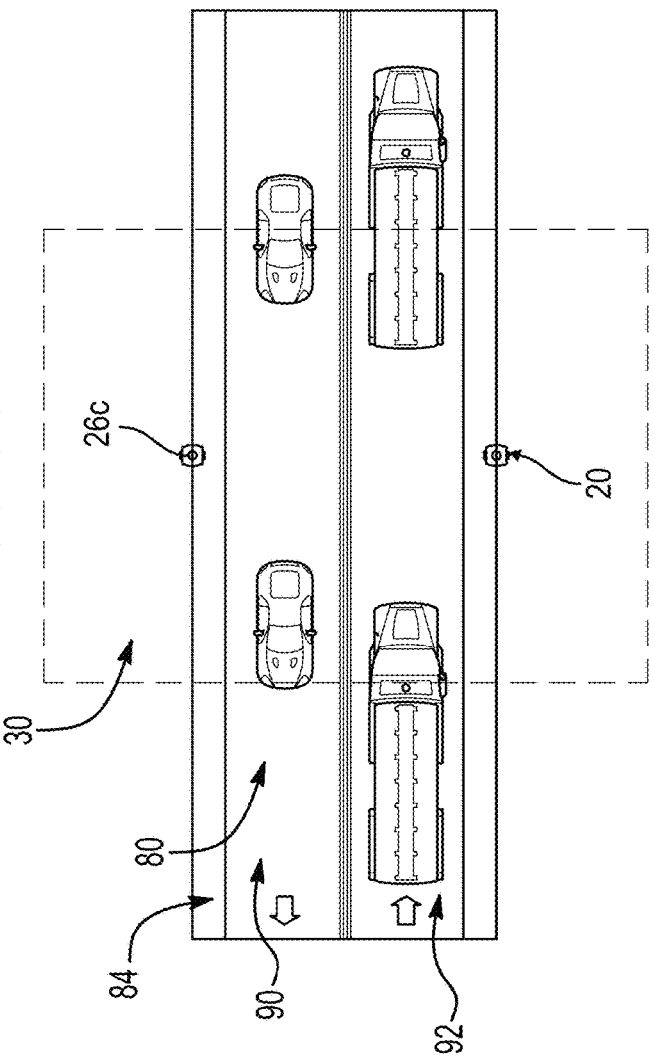
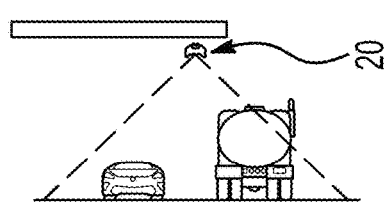
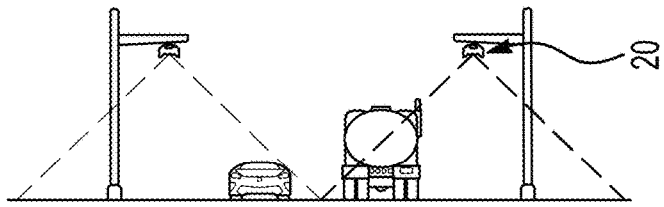
FIG. 10
FIG. 11

ALL SEEING ONE CAMERA SYSTEM FOR ELECTRONIC TOLLING

RELATED APPLICATIONS

This application claims the benefit of U.S. Provisional Application No. 62/750,872 filed Oct. 26, 2018, which is hereby incorporated herein by reference in its entirety.

FIELD OF THE INVENTION

The invention relates to automated electronic tolling systems used for transactions, and more particularly to cameras for electronic tolling systems.

DESCRIPTION OF THE RELATED ART

An All Electronic Tolling (AET) system consists of video, classification and transponder subsystems. The AET system uses the detection of a front end and a rear end of a vehicle to capture images of the license plates of the vehicle, and other images of the vehicle. The license plate images may be used to identify the vehicle for transaction purposes, such as for paying a toll on a toll road portion of a highway. Conventional tolling systems require a vehicle to pass a predetermined point on the toll road where a triggering device is triggered to command a camera to take an image of the vehicle. The images must be properly illuminated, in focus, and contain enough license plate data to enable the use of optical character recognition (OCR) software to find and read the license plate. The dedicated vehicle classifiers may be used to determine a classification of the vehicle based on its size, shape or number of axles. The images and classification data may be correlated with transponder identification data to toll the vehicle.

Conventional tolling systems use numerous components including several cameras, such as one positioned to capture the front license plate and another positioned to capture the rear license plate, overview camera to capture audit video stream, vehicle detectors, trigger devices, profile scanners, and tracking loops that are embedded in the highway pavement. In-pavement axle loops may also be provided for axle counting and classification of the vehicle. The numerous components are required to ensure that multiple characteristics of the vehicle are captured for vehicle identification and classification and obtaining information for audits or customer disputes.

However, the conventional tolling systems are disadvantageous due to the complexity and costs associated with installation and maintenance of the numerous components to complete a single transaction. For example, the in-pavement installation of loops requires precise alignment and is particularly labour intensive and costly to close the roadway to cut into the highway pavement.

SUMMARY OF THE INVENTION

An All Seeing One Camera (ASOC) method and system for electronic tolling of a vehicle travelling on a road surface includes a single camera or a single array of cameras that is configured to capture at least a front image and a rear image of the vehicle, which can be used to identify the vehicle as part of a transaction. In a camera array, each camera may be triggered synchronously or nearly synchronously. The camera or camera array is arranged normal to the road surface and defines a field-of-view that is defined by a plane that is parallel with the road surface. The field-of-view is defined to ensure that the captured images of the vehicle traveling through the field-of-view will have an optimal resolution for reading a license plate of the vehicle regardless of the position of the vehicle in the image. The method and system may include using an ultra-wide-angle rectilinear lens having a focal length between 12 and 14 millimeters to provide a large depth depth-of-field and a camera operating at a high imaging speed that is between 10 and 30 frames per second depending on the maximum expected vehicle speeds on the highway. The camera may be a high-resolution camera having a resolution that is between 30 and 40 megapixels. The camera may also include a multispectral sensor capable of capturing images beyond visible light range, such as infrared and ultra-violet, to enhance capabilities to determine vehicle identification and classification.

Top and side images of the vehicle may also be captured in the field-of-view. In addition to capturing images of the license plate to identify the vehicle, the captured images may also be used to track the vehicle, determine a size or shape of the vehicle, and/or determine a number of axles for classifying the vehicle. Using the ASOC method and system is advantageous in enabling multiple images of the vehicle to be captured without independent triggering, in contrast to conventional methods that require laser scanners and pavement loops for triggering the capturing of the images. Capturing multiple images ensures that all desirable data for the vehicle is obtained by the system within the field-of-view. Using the high-speed camera, ultra-wide-angle lens, and a light source that provides uniform light provides a more efficient tolling system that uses fewer components as compared with the conventional tolling systems. Thus, ASOC system enables a reduction in equipment costs and the costs pertaining to installation, operation, and maintenance.

According to an aspect of the invention, a method of electronic tolling for a vehicle travelling on a road surface includes using a single camera or a single array of cameras to capture a plurality of images of a vehicle.

According to an aspect of the invention, a method of electronic tolling for a vehicle travelling on a road surface includes capturing a plurality of images in which multiple license plates of vehicles are captured.

According to an aspect of the invention, a method of electronic tolling for a vehicle travelling on a road surface includes providing a single camera or a single array of cameras, arranging the single camera or the single array of cameras to have a field-of-view that is normal to the road surface and is defined by a plane that is parallel with the road surface, and capturing a front image and a rear image of the vehicle using the single camera or the single array of cameras in the field-of-view.

According to an embodiment of any paragraph(s) of this summary, the method may include capturing a top image and a side image of the vehicle using the single camera or the single array of cameras.

According to an embodiment of any paragraph(s) of this summary, the method may include imaging the vehicle at a rate that is at least 10 frames per second.

According to an embodiment of any paragraph(s) of this summary, the method may include using a rectilinear lens having a focal length that yields a total viewing angle of at least 90 degrees.

According to an embodiment of any paragraph(s) of this summary, the method may include providing a camera having a high resolution that is at least 30 megapixels.

According to an embodiment of any paragraph(s) of this summary, the method may include arranging the single camera or the single array of cameras above each lane marker on the road surface and aiming the single camera or the single array of cameras straight down at the road surface.

According to an embodiment of any paragraph(s) of this summary, the method may include orienting the single camera or the single array of cameras to have an optical axis of the single camera or the single array of cameras intercept the lane marker at 90 degrees relative to a transverse and longitudinal axis.

According to an embodiment of any paragraph(s) of this summary, the method may include arranging the single camera or the single array of cameras adjacent a lane on the road surface.

According to an embodiment of any paragraph(s) of this summary, the method may include capturing images of a front license plate and a rear license plate of the vehicle, wherein the images have a uniform pixel density.

According to an embodiment of any paragraph(s) of this summary, the method may include providing uniform light throughout the field-of-view in a predetermined area of interest using a light source.

According to an embodiment of any paragraph(s) of this summary, the method may include adjusting a perspective of at least one of a lens or a sensor to bias the field-of-view to a downstream side of an imaged area.

According to an embodiment of any paragraph(s) of this summary, the method may include maintaining the plane of the field-of-view to be parallel to the road surface.

According to an embodiment of any paragraph(s) of this summary, the method may include triggering each camera in the single array of cameras at a same time.

According to an embodiment of any paragraph(s) of this summary, the method may include capturing a plurality of images, selecting desirable images of the plurality of images that contain desirable data of the vehicle, and discarding undesirable images of the plurality of images.

According to an embodiment of any paragraph(s) of this summary, the method may include using optical character recognition to read a license plate of the vehicle captured in the front image and the rear image.

According to an embodiment of any paragraph(s) of this summary, the method may include determining a classification of the vehicle captured in the plurality of images.

According to an embodiment of any paragraph(s) of this summary, the method may include determining a trajectory of the vehicle captured in the plurality of images.

According to an embodiment of any paragraph(s) of this summary, the method may include capturing the front image and the rear image of at least two vehicles using the single camera or the single array of cameras in the field-of-view, wherein the at least two vehicles are traveling in opposite directions along the road surface.

According to an embodiment of any paragraph(s) of this summary, the method may include arranging the single camera or the single array of cameras in an intersection in which a plurality of vehicles are traveling in four different directions along the road surface.

According to an embodiment of any paragraph(s) of this summary, the method may include using a multispectral sensor that is operable in visible, infrared, and ultraviolet light spectrums.

According to another aspect of the invention, an electronic tolling system includes a single camera or a single camera array mounted relative to a road surface, the camera or camera array having a rectilinear wide-angle lens that provides a field-of-view and is arranged normal to the road surface, wherein the field-of-view is defined by a plane that is parallel with the road surface, a light source configured to provide uniform light throughout the field-of-view, wherein the single camera or the single camera array is configured to capture at least a front image and a rear image of a vehicle traveling along the road surface; and a processor that is communicatively coupled to the single camera or the single camera array for classifying the vehicle and determining a toll based on the captured front image and the rear image.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 10 shows another exemplary application of the electronic tolling system of FIG. 1 in which a camera is arranged in between two lanes having opposite directions of travel.

FIG. 11 shows another exemplary application of the electronic tolling system of FIG. 1 in which cameras of a camera array are arranged adjacent to two lanes having opposite directions of travel.

DETAILED DESCRIPTION

The principles described herein have particular application in electronic tolling systems used on toll roads for transaction purposes. FIGS. 1-4 shows an All Seeing One Camera (ASOC) system 20 according to the present application. The ASOC system 20 is arranged relative to a road surface 22 along which a vehicle 24 travels. The road surface 22 may be any suitable section of a road, such as a highway or a toll road on which the vehicle 24 may travel between 0 (stop-and-go) and 150 kilometers per hour (between 0 and 93 miles per hour). The vehicle 24 may be any suitable vehicle having any number of wheels. For example, the vehicle 24 may be a motorcycle or other two-wheeled vehicle, a four-wheeled car, truck, or van, or any vehicle having more than four wheels, such as a semi-trailer truck. The vehicle 24 may include a powered vehicle and one or more attached unpowered wheeled vehicle or unit, such as a trailer, a towed boat, or a towed car.

Figure 1:
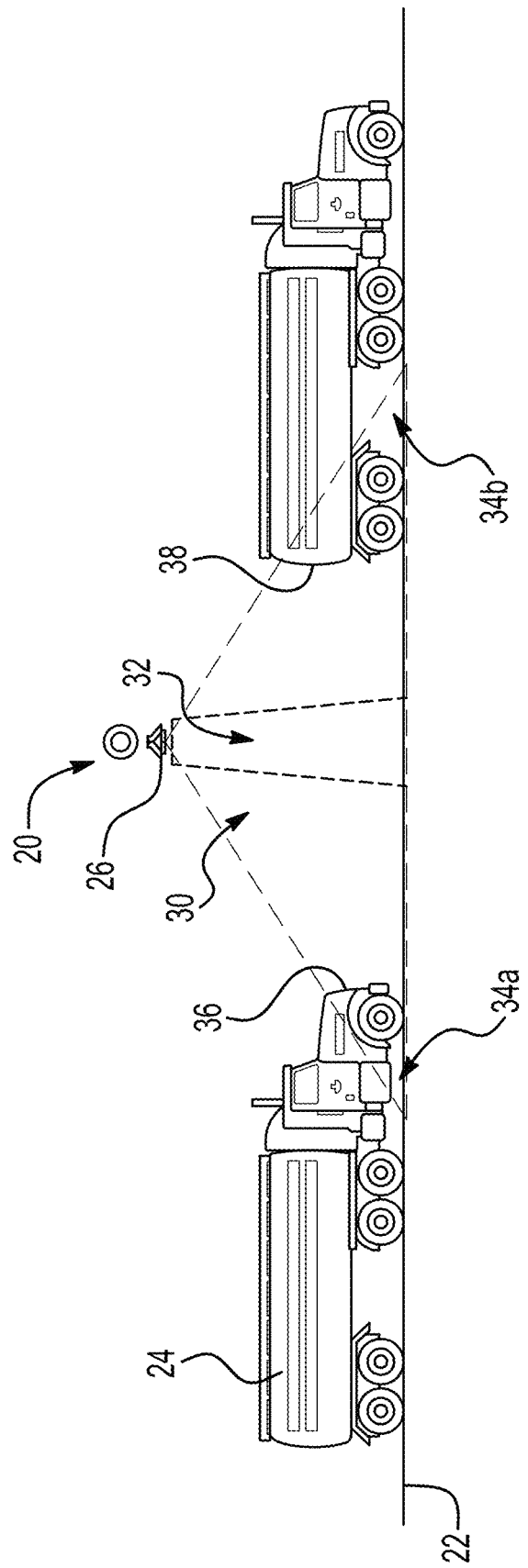
FIG. 1 shows a side elevation view of a vehicle traveling through an electronic tolling system according to an embodiment of the invention.
Figure 2:
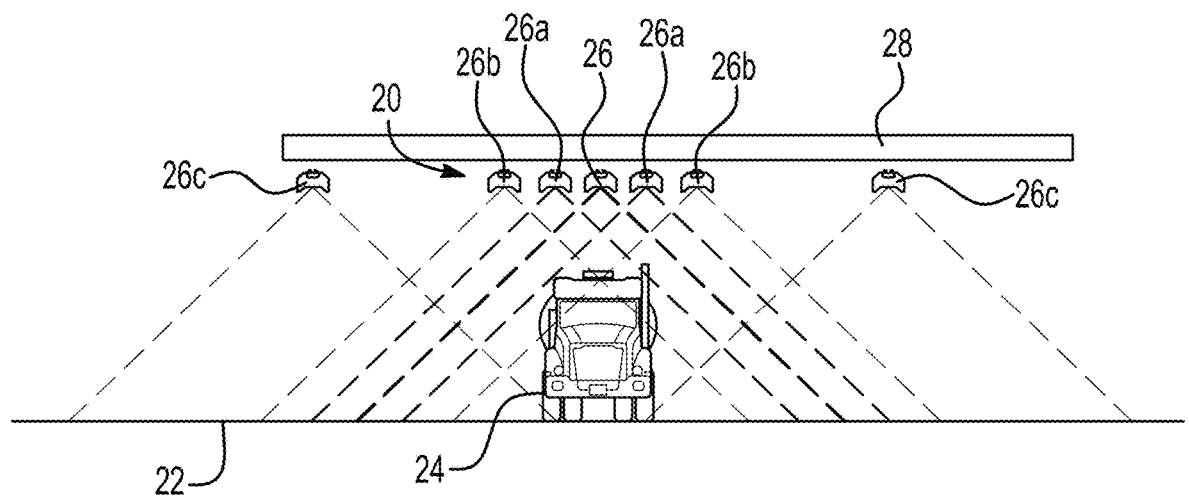
FIG. 2 shows a front elevation view of the electronic tolling system of FIG. 1.
Figure 3:
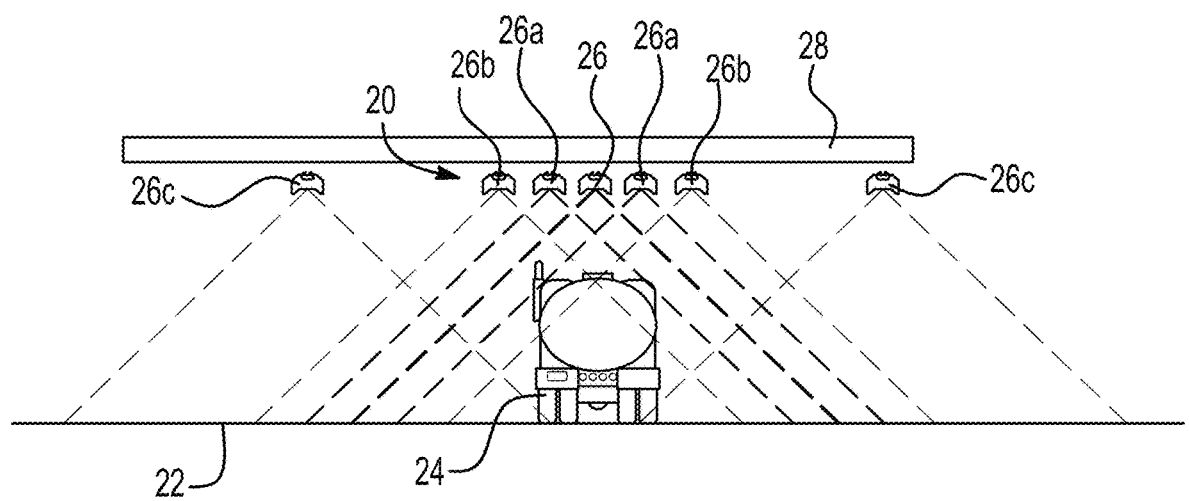
FIG. 3 shows a rear elevation view of the electronic tolling system of FIG. 1.
Figure 4:
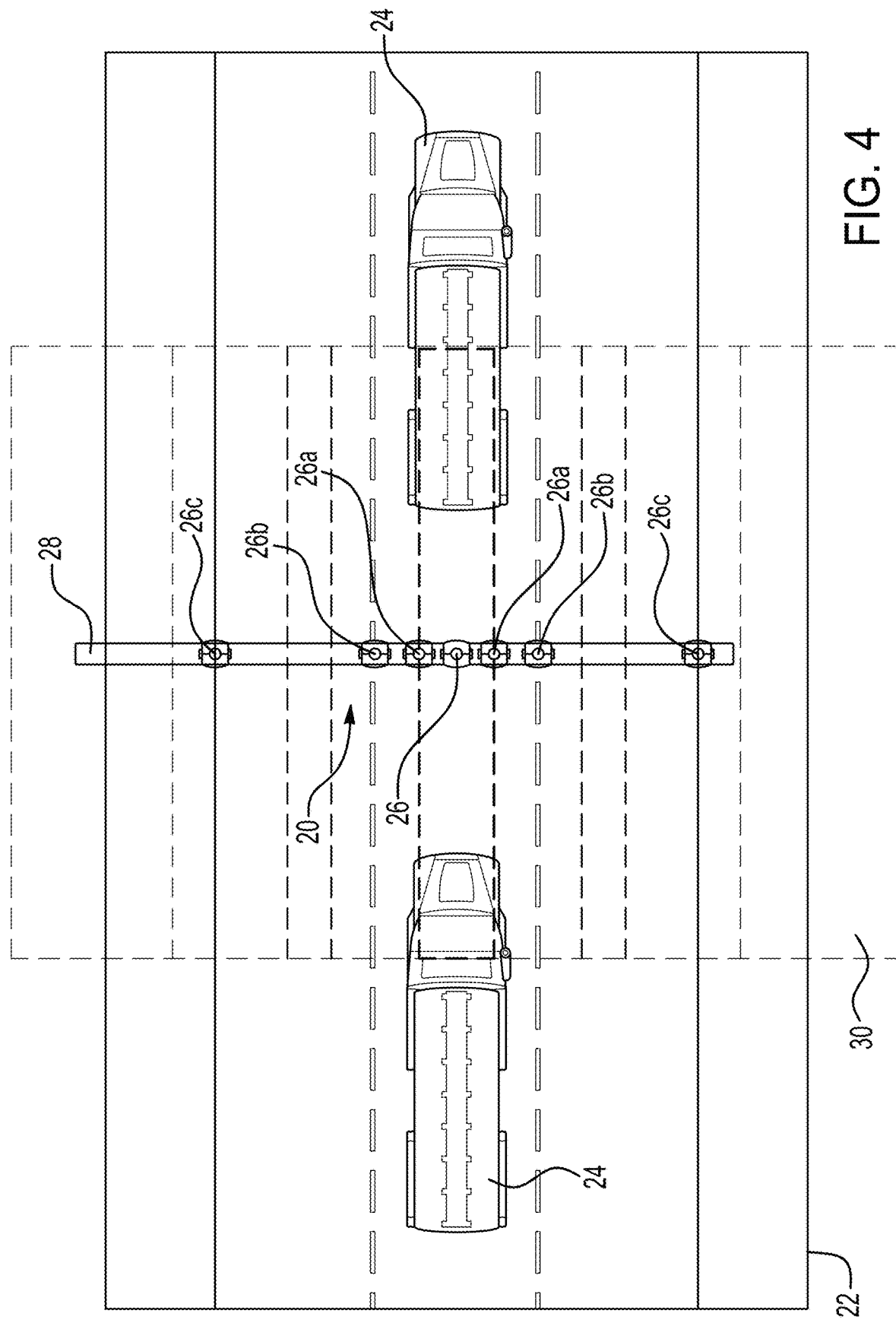
FIG. 4 shows a top elevation view of the electronic tolling system of FIG. 1.

The ASOC system 20 includes a single camera or a single camera array 26 that is mounted relative to the road surface 22 above the road surface 22. The camera or camera array 26 may be mounted above the vehicle 24 and normal to the road surface 22 such that the camera or camera array 26 faces straight down at the relevant section of the road surface 22. The camera or camera array 26 may be mounted using any suitable mount. For example, the camera or camera array 26 may be mounted to a gantry 28 that is arranged over the road surface 22, as shown in FIGS. 2-4. The gantry 28 may be an already-existing gantry or the gantry may be installed prior to mounting the camera. In other exemplary embodiments, the camera or camera array 26 may be mounted to other structures on the roadway, such as bridges, overpasses, barriers or free-standing posts that extend from the road surface 22 or adjacent to the road surface 22.

As shown in FIG. 2-4, the cameras may be in different positions relative to the road surface 22. Depending on the application, the ASOC system 20 may be centered over a vehicle lane on the road surface 22 or over a lane marker on the road surface 22. For example, the camera 26 may be centered over a vehicle lane and a camera 26b may be arranged over a lane marker. A camera 26a may be arranged between the center camera 26 and the lane marker camera 26b. Another camera 26c may be arranged adjacent the lane. Any combination of the cameras 26, 26a, 26b, 26c may be suitable. For example, only the lane marker cameras 26b may be used in certain applications and only the intermediate cameras 26a may be used in other applications. The arrangement of the camera of camera array 26 may enable the ASOC system 20 to aim straight downward at a particular area of the road surface 22 as compared with conventional tolling systems and methods which aim different cameras at different parts of the moving vehicles.

Any suitable camera or camera array 26 may be used and the camera or camera array 26 includes an ultra-wide rectilinear lens and an ultra-high resolution sensor. The sensor size and the focal length may be selected to achieve a particular field-of-view 30 which may be dependent on a height of the ASOC system 20 over the road surface 22. Each camera 26, 26a, 26b, 26c may have a field-of-view 30 and as shown in FIG. 4, the entire field-of-view 30 of the camera array may be rectangular in shape. The field-of-view 30 is defined by a plane parallel with the road surface 22. The camera or camera array 26 includes a light source that is configured to provide uniform light throughout the field-of-view 30. In other exemplary embodiments, the light may not be uniform throughout the field-of-view 30. An embodiment may also include a light source where the portions of the field-of-view 30 may have higher level of illumination in areas where license plates or other vehicle features of interest are the most visible.

The ASOC model implements the key relationship of the camera, lens and its positioning above the road surface 22 to achieve the minimum license plate OCR requirements. The wide-angle lens may have a focal length that is between 12 and 14 millimeters, or any focal length that yields a total viewing angle of at least 90 degrees. The total viewing angle may be between 90 and 120 degrees. A resolution of the camera or camera array 26 may be a high resolution that is at least 30 megapixels. The resolution may be between 30 and 40 megapixels. The camera or camera array 26 may be configured to capture color images. The camera or camera array 26 may be configured to provide images that are focused when the camera of camera array 26 is arranged up to between 4.57 and 7.62 meters (between 15 and 25 feet) above the road surface 22. The camera or camera array 26 may be correlated a radio-frequency system in which the sensor or sensors are configured to detect RF signals or images in a RF communication zone 32 within the field-of-view 30.

Using the ultra-wide-angle lens enables the camera or camera array 26 to capture images of the vehicle 24 as the vehicle 24 both enters the field-of-view 30 at an entry end 34a of the field-of view 30 and at an exit end 34b of the field-of-view 30. The camera or camera array 26 may have a speed that is between 10 and 30 frames per second to ensure that a predetermined number of images of the vehicle 24 are captured depending on the maximum expected speed of vehicles. Accordingly, a license plate arranged on a front end 36 of the vehicle 24 may be captured proximate the entry end 34a and a license plate arranged on a rear end 38 of the vehicle 24 may be captured proximate the exit end 34b. Top images and side images of the vehicle 24 may be captured when the vehicle 24 is in the field-of-view 30. The top images and side images may be used to determine a height or profile of the vehicle 26. The high frame rate and ultra-wide rectilinear lens enables the camera or camera array 26 to capture optimal horizontal and vertical pixel resolutions for front and rear license plates of the vehicle 24.

Figure 5:
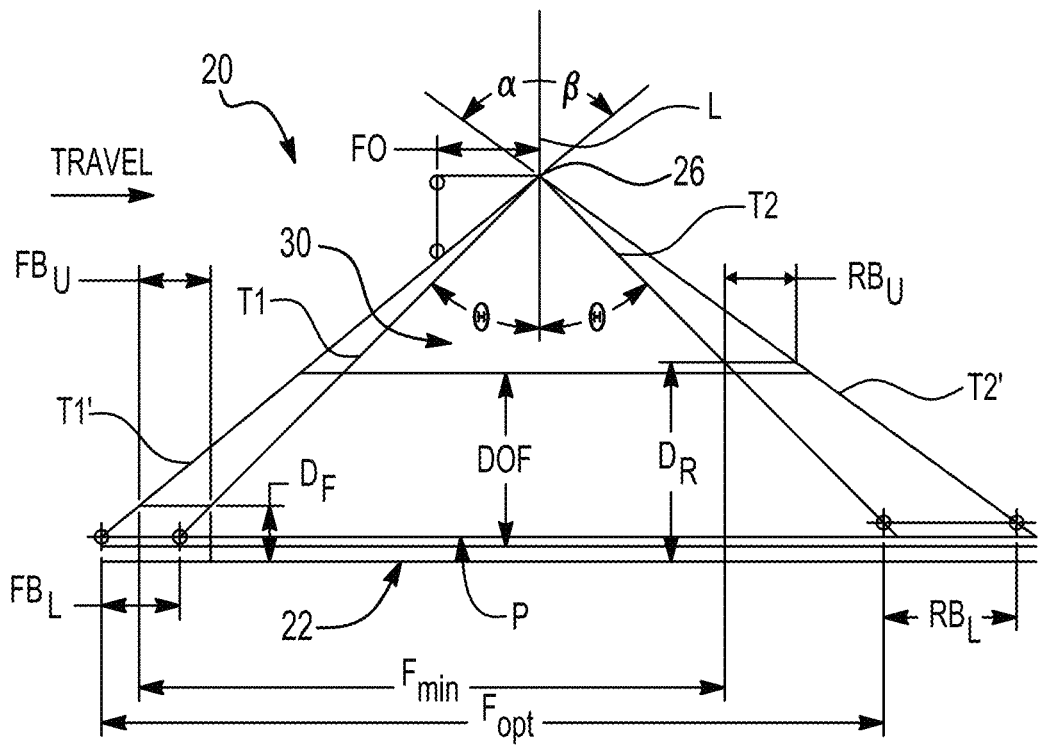
FIG. 5 shows geometry for a side elevation view in a direction of travel of the vehicle of FIG. 1.
Figure 6:
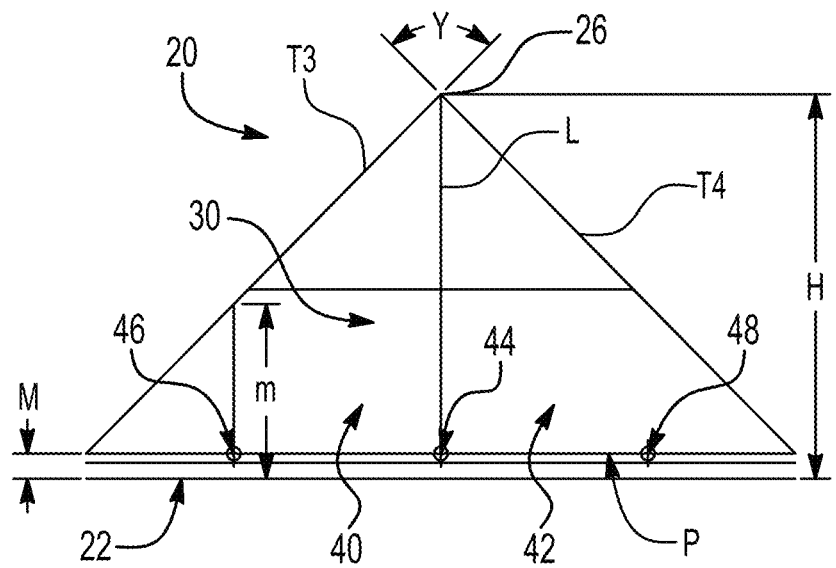
FIG. 6 shows geometry for a rear elevation view from a point of view of a driver of the vehicle of FIG. 1.

Referring in addition to FIGS. 5 and 6, an exemplary orientation of the ASOC system 20 having the single camera 26 is shown. The ASOC system 20 may be arranged such that a frame will occur every 1.4 meters as the vehicle 24 moves through the field-of-view 30. FIG. 5 shows a side elevation view in the direction of travel of the vehicle 24 and FIG. 6 shows a rear elevation view from the point of view of the driver of the vehicle 24. The camera 26 is mounted along a longitudinal axis L that is perpendicular to the road surface 22 and may have a speed of 30 frames per second. In an exemplary embodiment, the lens of the camera 26 may be a 14-millimeter lens and the camera 26 may have a 40 megapixel sensor. The camera 26 may be arranged at a height H above the road surface 22 that is between 7 meters and 7.5 meters (between 23 and 24.6 feet). The camera 26 is arranged such that transverse axes T1 and T2, which define the field-of-view 30, extend transverse to the longitudinal axis L by an angle θ. In an exemplary embodiment, the angle θ may be approximately 45 degrees. The vertical depth of focus DOF may be between 3.19 and 3.21 meters (between 10.4 and 10.5 feet).

The camera 26 may be re-oriented, such as shifted or tilted or otherwise adjusted to bias the camera 26 downwardly and ensure that a plane of focus within the field-of view 30 is maintained parallel to the road surface 22. In an exemplary embodiment, a shift of approximately 1.18 millimeters is applied to the sensor of the camera 26 to maintain a front upper bound $FB_U$, or the upper bound of the horizontal distance in which the front end 36 of the vehicle 24 is captured, and a rear upper bound $RB_U$, or the upper bound of the horizontal distance in which the rear end 38 of the vehicle 24 is captured, at approximately 1.3 meters (4.27 feet). In an exemplary embodiment, a front lower bound $FB_L$ may be less than a rear lower bound $RB_L$. For example, the front lower bound $FB_L$ may be approximately 1.43 meters (4.7 feet) and the rear lower bound $RB_L$ may be approximately 2.45 meters (8.04 feet). The vertical distance $D_F$ between the front upper bound $FB_U$ and the road surface 22 may be approximately 1.2 meters (3.9 feet). The vertical distance $D_R$ between the rear upper bound $RB_U$ and the road surface 22 may be approximately 3.6 meters (11.8 feet) or any distance that is sufficient to capture images of high mounted license plates on the rear of trucks.

After the shift, the angle α between the longitudinal axis L and the shifted transverse axis T2' may be approximately 54 degrees and the angle β between the longitudinal axis L and the shifted transverse axis T1' may be approximately 50 degrees. A frame offset FO may be approximately 1.87 meters (6.14 feet) to avoid masking at the height H of the camera 26. The arrangement enables a horizontal distance $F_{min}$ that pertains to a minimal number of frames and a horizontal distance $F_{opt}$ that pertains to an optimal or average number of frames. For example, at least eight frames may be captured and eleven frames may be the average number of frames captured. The area between T1-T1' and T2-T2' is defined as the optimum image zone in which front and rear license plates for the vehicle may be captured.

FIG. 6 shows a first lane 40 and a second lane 42 that are separated by a lane marker 44 arranged along the longitudinal axis L of the camera 26. A first lane shoulder marker 46 may be arranged at an end of the first lane 40 opposite the lane marker 44. A second lane shoulder marker 48 may be arranged at an end of the second lane 42 opposite the lane marker 44. The lane marker 44 and the shoulder markers 46, 48 may be arranged at a height M above the road surface 22. An angle γ between the transverse axes T3 and T4 may be approximately 90 degrees. A vertical distance m between the road surface 22 and an intersection point at which an axis of the shoulder marker 46 meets the transverse axis T3 may be approximately 3.2 meters (10.5 feet). The dimensions described herein are merely exemplary and many other arrangements or dimensions may be suitable for the electronic tolling system.

Figure 7:
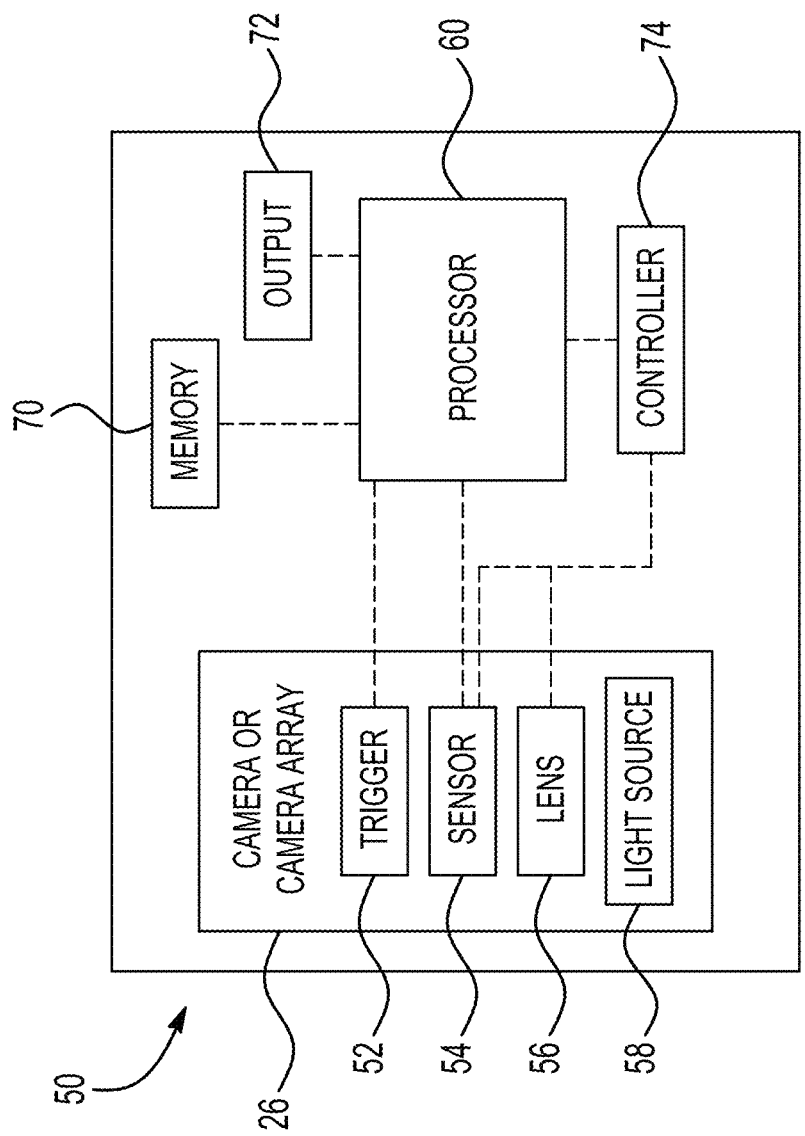
FIG. 7 shows a control system for the electronic tolling system of FIG. 1.

Referring in addition to FIG. 7, the ASOC system 20 further includes a control system 50 for the camera or camera array 26, which may be integrated within the camera or camera array 26, or arranged as a separate unit. The camera array 26 may include a triggering device 52, a sensor 54, a lens 56, and a light source 58. Any suitable triggering device 52 may be used and the triggering device 52 may be a light, microwave or a motion trigger. The triggering device 52 may be used to synchronize or nearly synchronize the capturing performed by all of the cameras in a camera array. Any suitable circuit may be used for triggering in response to detection of the vehicle 24. In other exemplary embodiments, the triggering device 52 may continuously operate such that the camera or camera array 26 continuously takes images of the section of the road surface 22.

Aiming the camera or camera array 26 straight down at the roadway enables the images to be in focus such that precise triggering is not necessary to achieve focused images. The triggering device 52 may communicate with the sensor 54 directly, or through a processor 60, to capture an image of the vehicle. Any suitable light source may be used, such as a light-emitting diode (LED), and the light source 58 may be configured to provide a uniform amount of light throughout the field-of-view 30 or tailored to regions of interest within the field-of-view 30. The sensor 54 may be a multispectral sensor that is operable in visible, infrared, and ultraviolet light spectrums.

The camera 26 may include a gantry or pole interface and any suitable attachment method may be used. For example, the camera 26 may be bolted to the gantry. The main body of the camera 26 may be spaced from the gantry or pole interface. The camera 26 may be configured to enable replacement or maintenance of the camera 26 without having to re-align the entire mounting device. The gantry or pole interface may be formed of any suitable material, such as a metal material. The entire mounting attachment may be formed as a single integral component or the components may be separately attached to each other. In other exemplary embodiments, the mounting attachment may be adjustable to precisely position or adjust the camera 26 relative to a desired imaging area, such as if the desired imaging area changes.

The main body of the camera 26 may have any suitable shape. The camera 26 may include a particular sensor to achieve a predetermined field-of-view 30. The field-of-view 30 may be dependent on the height of the camera 26 above the road surface 22. Many different types and arrangements of cameras may be suitable. In still other embodiments, an array of cameras is used, and the cameras are synchronized with each other to act similarly to the operation of a single camera. Providing an array of cameras over a single lane may be advantageous in providing redundancy and preventing masking.

As shown in FIG. 7, the control system 50 further includes the processor 60 which is configured to receive the images from the camera or camera array 26 and identify the vehicle as part of a transaction. The camera or camera array 26 may be configured for machine learning (ML) image processing. The processor 60 may perform machine learning algorithms to determine the vehicle classification and vehicle tracking or trajectory data of the vehicle traveling through the field-of-view 30. Any suitable processor or group of processors may be used in the control system 50 as the processor 60 that may be in communication with a memory 70 that stores data pertaining to identifying the vehicles. For example, the memory 70 may be configured to store information pertaining to the number of axles and a classification of vehicle for comparison with the images and data received by the processor 60. Vehicle classifications may be the Federal Highway Administration (FHWA) 13-Category Rule Set or other categories. The processor 60 may be configured to receive the captured images from the camera or camera array 26 and determine which images are desirable images that contain desirable data pertaining to the vehicle 24, such as the license plate, number of wheels or axles, position, height, or other dimensions of the vehicle 24. The remaining images that do not contain desirable data may be filtered and discarded by the processor 60, or, in other embodiments. An exemplary embodiment of processor 60 may be more than one processor that perform specific functions such as image processing, classification, tracking, and vehicle correlation to RF communication zone 32.

In addition to comparing the captured images with data stored in the memory 70, the processor 60 may be configured to perform a post image-receiving process, such as determining a classification of a vehicle based on the size or number of axles or reading the license plate. In an exemplary application, the processor 60 may be configured to use optical character recognition (OCR) software to detect and read an image of the license plate to identify the vehicle. In another exemplary application, the processor 60 may determine a classification of the vehicle 24 by reading the image and determining the number of axles, position or size/shape of vehicles. The processor 60 may be further configured to provide an output 72, which may be any suitable output 72. The output 72 may pertain to specific data about the vehicle 24, such as the classification, or the output 72 may pertain to the desired images of the license plate of the vehicle 24. In still another exemplary application, the processor 60 may provide further information about the vehicle 24 as evidence for an audit.

In an exemplary embodiment, the control system 50 may include a controller 74 that is used to re-orient or tilt and/or shift the sensor 54 or the lens 56 of the camera 26 to bias the field-of-view 30 to the downstream side of the imaged area while maintaining the plane of focus to be parallel to the road surface 22 and maintaining uniform pixel densities of the captured images. The processor 60 may be configured to determine if the sensor 54 and/or the lens 56 is to be tilted and/or shifted and the processor 60 may communicate with the controller 74.

Referring now to FIGS. 8-12, exemplary applications for the ASOC system 20 defining the field-of-view 30 on a road or highway 80 are schematically shown. Top views, front views, and rear views are shown for the applications. In other exemplary applications, the ASOC system 20 may include between three and six cameras used on a three-lane and two-shoulder highway. Vehicles may travel on the road or highway 80 at a speed that is for example between 0 and 150 kilometers per hour (between 0 and 93 miles per hour).

Figure 8:
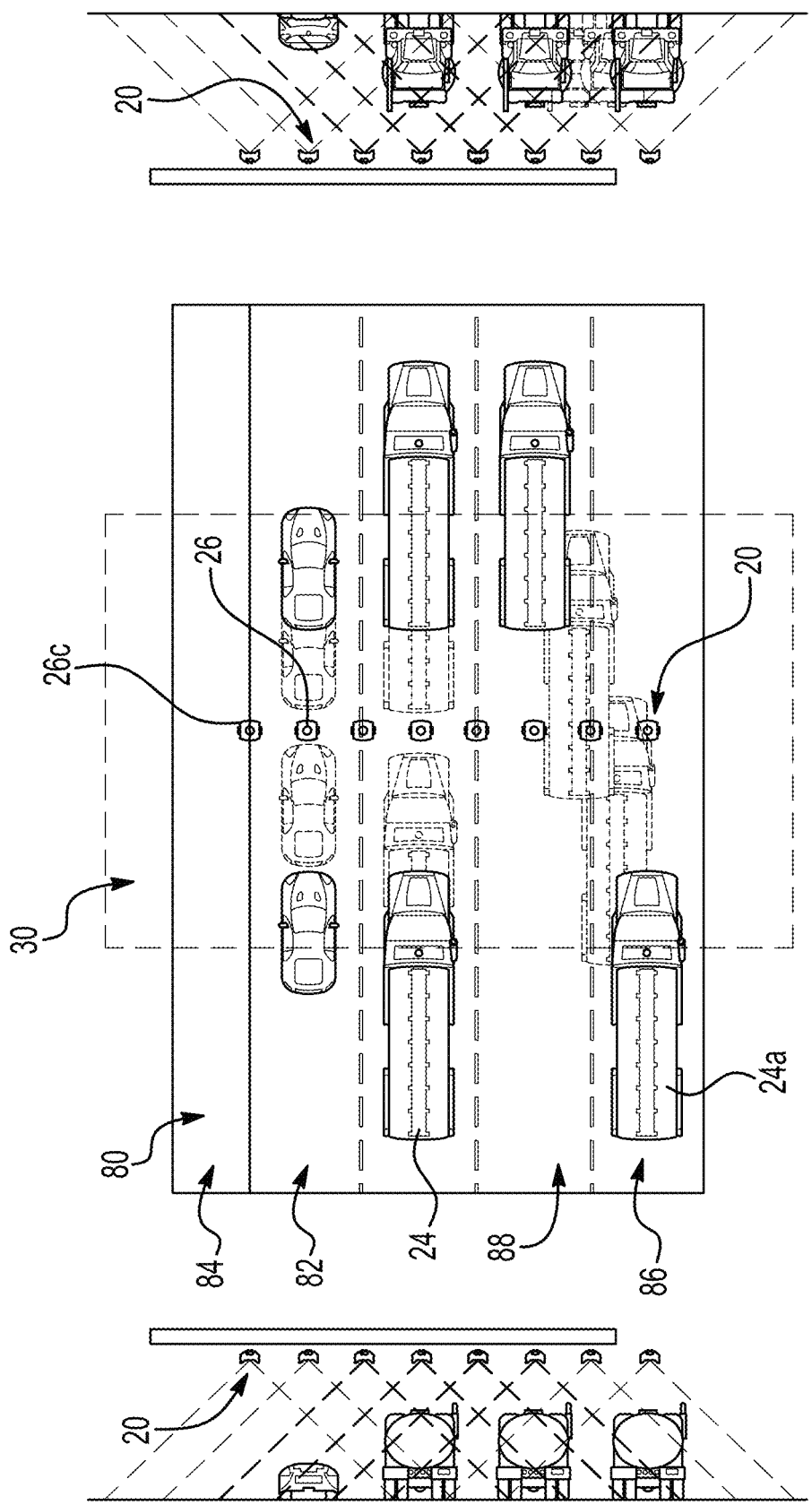
FIG. 8 shows an exemplary application of the electronic tolling system of FIG. 1 in which a camera array is arranged over a multi-lane roadway.

FIG. 8 shows the highway 80 having multiple lanes in which traffic is traveling in the same direction. A single camera or a single camera array may be used. The camera array may include a plurality of synchronous cameras that extend over an entire width of the highway 80 to define a field-of-view 30. As shown in a first lane 82, the camera 26 may be arranged over a center of the lane. The ASOC system 20 may also include cameras 26c that are arranged on the sides of the lanes, such as proximate a shoulder 84 of the first lane 82, or between the first lane 82 and a second lane 86. Arranging the cameras 26c on the side of the road, such as the camera 26c that is arranged proximate the shoulder 84, may be advantageous in that accessing the camera for maintenance or installing the camera may be less complex as compared with the cameras mounted in the middle of the road.

The camera or camera array may be configured to capture a front image of the vehicle 24 as the vehicle 24 enters the field-of-view 30 and a rear image of the vehicle 24 as the vehicle 24 exits the field-of-view 30, such as for reading a license plate of the vehicle 24. The cameras 26, 26c may be configured to capture different views of the vehicle 24 and all of the cameras 26, 26c in the array may be triggered at a same or a near-same time. Using the ASOC system 20 is advantageous in that the system may be used to image front, rear, top, and side images of the vehicle and track the vehicle through the field-of-view 30. As shown in additional lanes 86, 88, a camera may be arranged over each lane 86, 88. A camera 26 may be arranged at a central location over each of lanes and cameras 26c may be arranged along sides of the lanes 86, 88. The cameras may be in synchronization with each other and oriented to allow the camera array to see multiple lanes with minimal masking and to provide redundancy. The cameras may have a master and slave arrangement.

As shown by the vehicle 24a moving from the lane 86 to the lane 88, the ASOC system 20 arranged over the lanes 86, 88 may be used to track the vehicle 24a as the vehicle 24a moves from the outer lane 86 to the adjacent lane 88. The arrangement of the cameras over the lane are merely exemplary and the cameras may be arranged at any suitable position. Any suitable number of cameras may form the array. In other arrangements, the camera array may only include centrally arranged cameras, or only include side cameras. In still other arrangements, only one camera may be used. The arrangement of the cameras and the number of cameras in the array will be dependent on the direction and speed of the vehicles traveling the highway 80.

Figure 9:
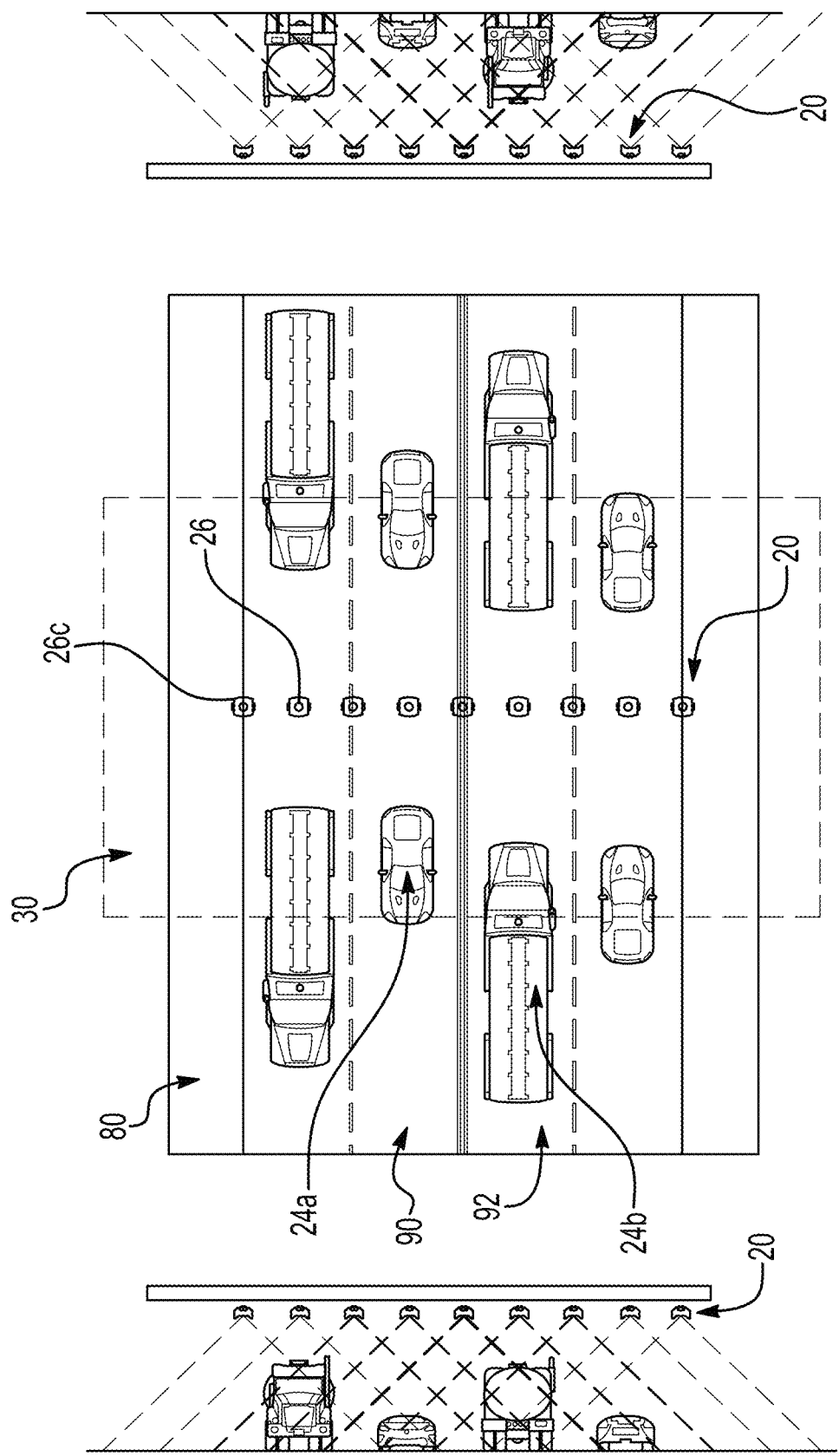
FIG. 9 shows another exemplary application of the electronic tolling system of FIG. 1 in which a camera array is arranged over a multi-lane roadway having multi-directional lanes.

FIG. 9 shows the ASOC system 20 arranged on the highway 80 which has at least two lanes 90, 92 along which the vehicles 24a, 24b are traveling in opposite directions. The camera or camera array 26, 26c is arranged over all of the lanes 90, 92 such that the single camera or camera array may be used to capture images of the vehicle 24a traveling through the field-of-view 30 in a first direction and the vehicle 24b traveling through the field-of-view 30 in an opposite direction. For example, the camera or camera array may be configured to capture a front license plate of the vehicle 24b and a rear license plate of the vehicle 24a in the same image or images. As shown in FIG. 9, a plurality of vehicles that are in the field-of-view 30 at a same time may be captured in a same image.

FIGS. 10 and 11 show different camera arrangements for the ASOC system 20 arranged over a multi-lane highway 80 having lanes 90, 92 with different directions of traffic. As shown in FIG. 10, the camera or camera array may include a single camera 26 that is centered along the barrier line between the lanes 90, 92 and is configured to define the field-of-view 30 in which license plates of the oppositely traveling vehicles are captured. As shown in FIG. 11, the camera or camera array may include cameras 26c of the array that are arranged on sides of the lanes 90, 92 and define the field-of-view 30. For example, the cameras 26c may be arranged along the shoulder 84 of the highway 80. These cameras 26c are not above the highway 80 and are accessible for installation and maintenance with minimal or no impact to free flow of vehicle traffic.

Figure 12:
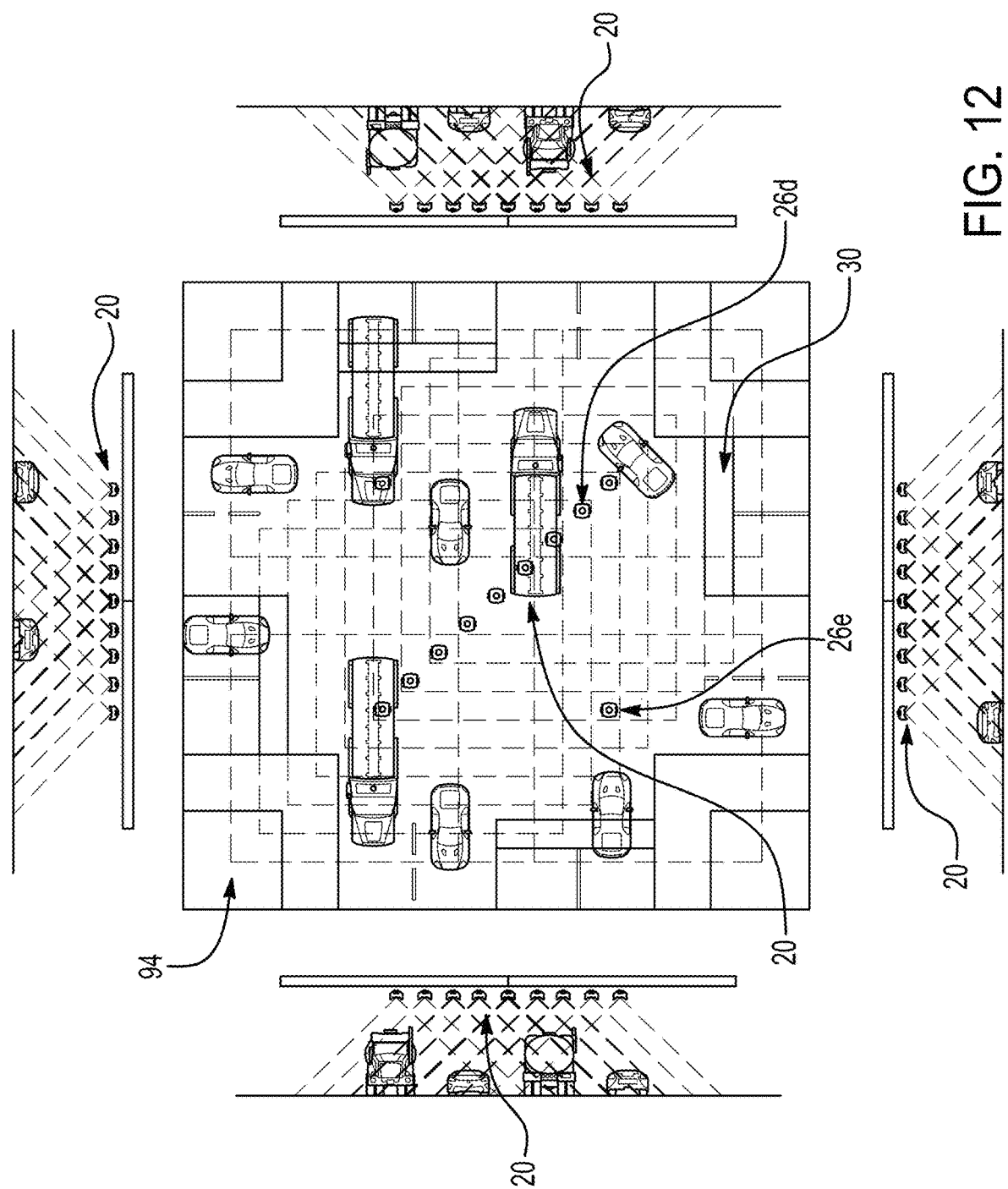
FIG. 12 shows another exemplary application of the electronic tolling system of FIG. 1 in which a camera array is arranged in an intersection.

FIG. 12 shows the ASOC system 20 arranged in an intersection 94 in which cars are traveling in different directions. The ASOC system 20 may include an array 26d of cameras that are arranged to extend transversely relative to a center of the intersection 94. The ASOC system 20 may further include at least one additional camera 26e that is arranged in a corner of the intersection 94. Cameras may be arranged in different corners of the intersection 94 and may be triggered simultaneously or nearly simultaneously with the cameras in the array 26d extending transversely relative to the center of the intersection 94. For example, two cameras may be arranged in opposite corners of the intersection 94, as shown in FIG. 12. Accordingly, a plurality of field-of-views 30 may be arranged along the intersection 94 to ensure that all the vehicles traveling in the intersection 94 are captured by the ASOC system 20. This arrangement may use cameras with a square field-of-view 30.

Figure 13:
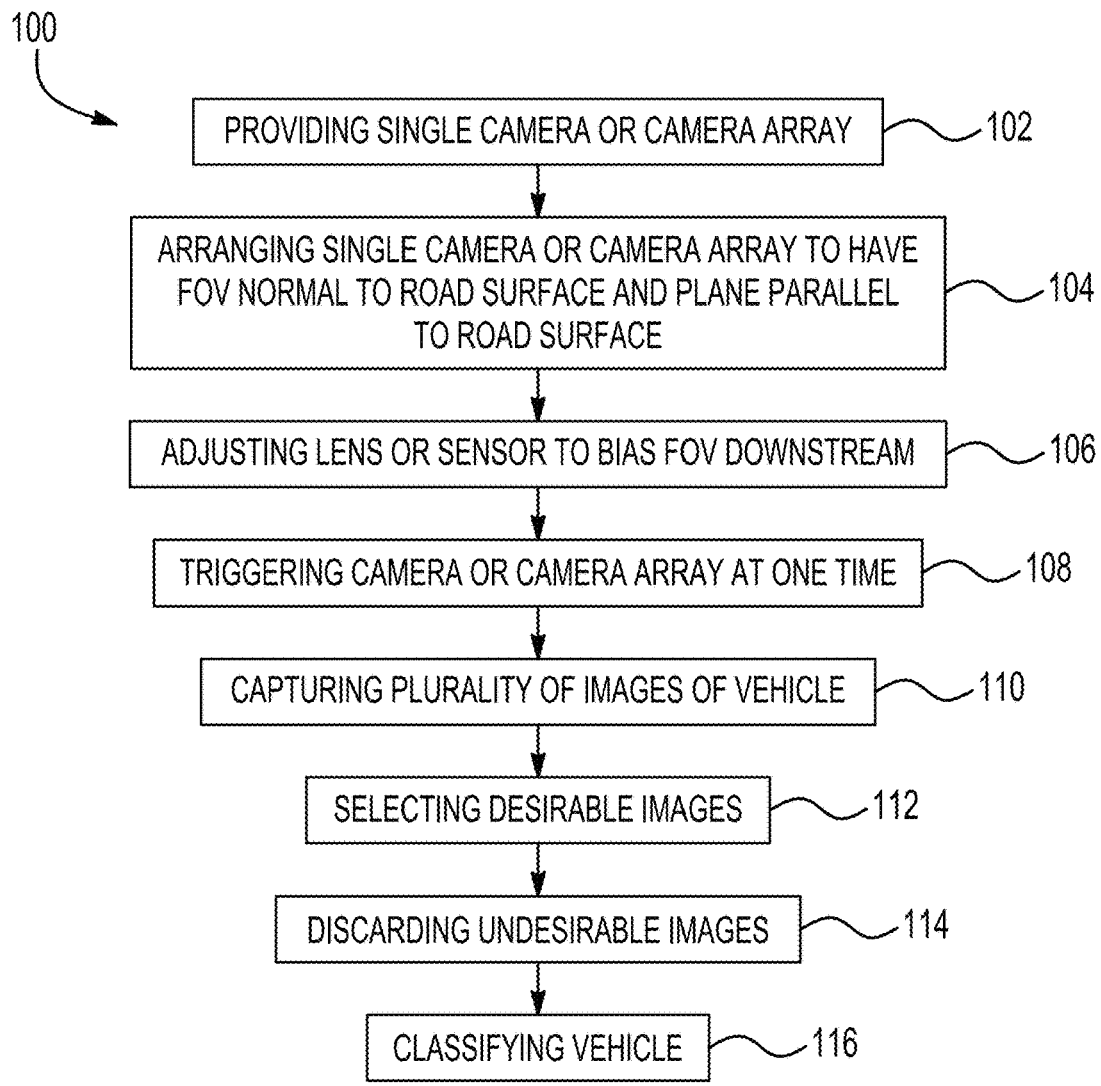
FIG. 13 shows a flow chart illustrating a method of electronic tolling for a vehicle using the electronic tolling system of FIG. 1.

Referring now to FIG. 13, a method 100 of electronic tolling using the ASOC system 20 is shown. Step 102 of the method 100 includes providing the single camera or a single camera array 26 (shown in FIGS. 1-12). The single camera array 26 may include a plurality of cameras that are synchronized and configured to be triggered at a same time. Each camera in the single camera array 26 is configured to take front images and rear images. Step 104 of the method 100 includes arranging the single camera or single camera array 26 to have the field-of-view 30 that is normal to the road surface 22 and is defined by a plane that is parallel with the road surface 22 (shown in FIG. 1). Step 104 may include aiming the single camera or the single array of cameras 26 straight down at the road surface 22. Step 104 may include arranging the single camera or the single array of cameras 26 above each lane marker on the road surface 22. Step 104 may further include orienting the single camera or the single array of cameras 26 to have an optical axis of the single camera or the single array of cameras 26 intercept the lane marker at 90 degrees relative to a transverse T1, T2, T3, T4 and a longitudinal axis L (shown in FIG. 5).

Step 106 of the method 100 includes adjusting the lens 56 or the sensor 54 to bias the field-of-view 30 to a downstream side of the imaged area (shown in FIG. 7). Step 106 may include maintaining the plane of the field-of-view 30 to be parallel to the road surface 22. Step 108 of the method 100 includes triggering the camera or camera array 26 at one time. The camera or camera array 26 may be triggered by the triggering device 52 (shown in FIG. 7). Triggering the camera or camera array 26 at one time is advantageous as compared with conventional electronic tolling systems in that additional devices, such as pavement loops, may not be necessary for triggering the camera or camera array 26.

Step 110 of the method 100 may include capturing a plurality of images of the vehicle 24 to identify the vehicle for a transaction, such as on a toll road. Step 110 may include capturing at least one of a front image, rear image, top image, and a side image of the vehicle 24 in the field-of-view 30. Capturing the plurality of images may include capturing images of a front license plate and a rear license plate of the vehicle 24, and the images may have a uniform pixel density. The top or side images may further be used to determine the number of axles of the vehicle 24. A uniform light may be provided throughout the field-of-view 30 using a light source 58, such as an LED. A multispectral sensor that is operable in visible, infrared, and ultraviolet light spectrums may be used to assist in vehicle classification.

After the images are captured by the camera and the camera array 26, step 112 of the method 100 may include selecting desirable images of the plurality of images that contain desirable data of the vehicle 24. Desirable data may include license plates, size, shape, position or a number of axles of the vehicle 24. The processor 60 may be configured to determine which images are desirable images (as shown in FIG. 7). For example, the processor 60 may be configured to select a minimal number of desirable images. In an exemplary embodiment, eight images may provide suitable data for the vehicle 24. Step 112 may further include using OCR to read a license plate of the vehicle 24 captured in the front image and the rear image. The processor 60 may be configured to perform OCR. Step 114 of the method 100 may include discarding undesirable images of the plurality of images. The processor 60 may be configured to determine which images to discard. In an exemplary embodiment, step 116 of the method 100 may include classifying the vehicle 24 based on the images. The classification of the vehicle may be determined based on its size/shape or a number of trailers or axles of the vehicle using the set of multi-perspective vehicle images. Vehicle classifications may be categories such as the FHWA 13-Category Rule Set.

Figure 14:
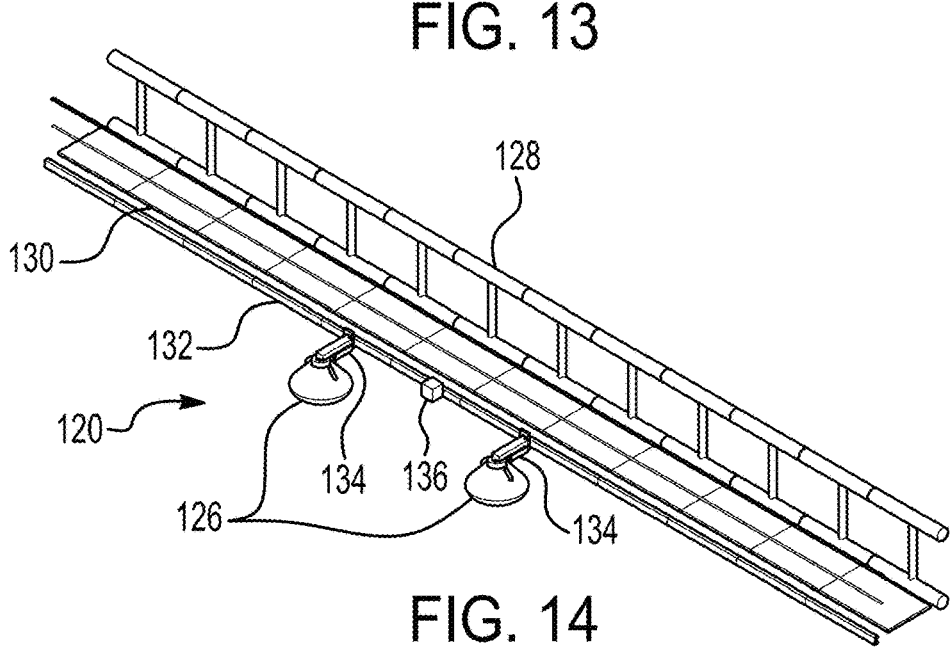
FIG. 14 shows an elevation view of an electronic tolling system according to another embodiment of the invention.

Referring now to FIG. 14, an electronic tolling system 120 according to another exemplary embodiment of the present application includes a camera array 126 having two cameras which are mounted to a gantry 128 over a roadway. The camera array 126 may include more than two cameras in other embodiments. Each camera in the camera array 126 may be mounted to an upstream face 132 of the catwalk 130.

A mounting arm 134 of each camera may extend outwardly from the upstream face 132 of the catwalk 130. For example, the mounting arm 134 may extend perpendicularly to the catwalk 130. In other exemplary embodiments, the mounting arm 134 may be adjustable to precisely position the corresponding camera.

The camera array 126 may be arranged over lane markers on the roadway below the catwalk 130. For example, the roadway may be a three-lane road having a camera over the lane marker separating a first lane and an adjacent second lane and the lane marker separating a second lane and an adjacent third lane, such that the two cameras are spaced by one lane therebetween. The electronic tolling system 120 may further include a triggering device 136 and a control system that is similar to the control system 50 of FIG. 7. The triggering device 136 may be used for synchronization of the cameras in the camera array 126. As shown in FIG. 14, the triggering device 136 may be mounted to the gantry 128. Any suitable triggering device 136 may be used and in the exemplary embodiment, the triggering device 136 may be configured to capture at least 10 frames per second.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of electronic tolling for a vehicle travelling on a road surface, the method comprising: arranging a single camera or a single array of cameras having a rectilinear wideangle lens that provides to have a field-of-view that is normal to the road surface and is defined by a plane that is parallel with the road surface; arranging a light source to provide uniform light throughout the field-of-view; and capturing a front image and a rear image of the vehicle traveling along the road surface using the single camera or the single array of cameras in the field-of-view using the single camera or the single array of cameras; determining a classification of the vehicle based on the captured front image and the rear image; and determining a toll for the vehicle based on the classification of the vehicle.

2. The method of claim 1 further comprising imaging the vehicle at a rate that is at least 10 frames per second depending on the maximum expected vehicle speeds on the highway.

3. The method of claim 1 further comprising using a rectilinear lens having a focal length that yields a total viewing angle of at least 90 degrees.

4. The method according to claim 1 further comprising using a camera having a high resolution that is at least 30 megapixels.

5. The method according to claim 1 further comprising arranging the single camera or the single array of cameras above each lanemarker on the road surface and aiming the single camera or the single array of cameras straight down at the road surface.

6. The method according to claim 5 further comprising orienting the single camera or the single array of cameras to have an optical axis of the single camera or the single array of cameras intercept the lane marker at 90 degrees relative to a transverse and longitudinal axis.

7. The method according to claim 1 further comprising arranging the single camera or the single array of cameras adjacent a lane on the road surface.

8. The method according to claim 1 further comprising capturing images of a front license plate and a rear license plate of the vehicle, wherein the images have a uniform pixel density.

9. The method according to claim 8 further comprising providing the uniform light throughout the field-of-view in a predetermined area of interest using a-the light source.

10. The method according to claim 1 further comprising: adjusting a perspective of at least one of a lens or a sensor to bias the field-of view to a downstream side of an imaged area; and maintaining the plane of the field-of-view to be parallel to the road surface.

11. The method according to claim 1 further comprising triggering each camera in the single array of cameras at a same time.

12. The method according to claim 1, wherein capturing the front image and the rear image includes: capturing a plurality of images; selecting desirable images of the plurality of images that contain desirable data of the vehicle; and discarding undesirable images of the plurality of images.

13. The method according to claim 12 further comprising using optical character recognition to read a license plate of the vehicle captured in the front image and the rear image.

14. The method according to claim 12 further comprising determining a trajectory of the vehicle captured in the plurality of images.

15. The method according to claim 1 further comprising capturing the front image and the rear image of at least two vehicles using the single camera or the single array of cameras in the field-of-view, wherein the at least two vehicles are traveling in opposite directions along the road surface.

16. The method according to claim 15 further comprising arranging the single camera or the single array of cameras in an intersection in which a plurality of vehicles are traveling in four different directions along the road surface.

17. The method according to claim 1 further comprising using a multispectral sensor that is operable in visible, infrared, and ultraviolet light spectrums to assist in vehicle classification.

18. An electronic tolling system comprising: a single camera or a single camera array mounted relative to a road surface, the camera or camera array having a rectilinear wide-angle lens that provides a field-of view and is arranged normal to the road surface, wherein the field-of-view is defined by a plane that is parallel with the road surface; a light source configured to provide uniform light throughout the field-of-view, wherein the single camera or the single camera array is configured to capture at least a front image and a rear image of a vehicle traveling along the road surface; and a processor that is communicatively coupled to the single camera or the single camera array for classifying the vehicle and determining a toll based on the captured front image and the rear image.

19. A method of electronic tolling for a vehicle travelling on a road surface, the method comprising: arranging a single camera or a single array of cameras to have a field-of-view that is normal to the road surface and is defined by a plane that is parallel with the road surface; capturing a front image and a rear image of the vehicle using the single camera or the single array of cameras in the field-of-view; and capturing a top image and a side image of the vehicle using the single camera or the single array of cameras.

* * * * *